H. J. SMITH.
FRICTION CLUTCH.
APPLICATION FILED MAR. 30, 1910.
1,083,301.
Patented Jan. 6, 1914.
3 SHEETS—SHEET 1.
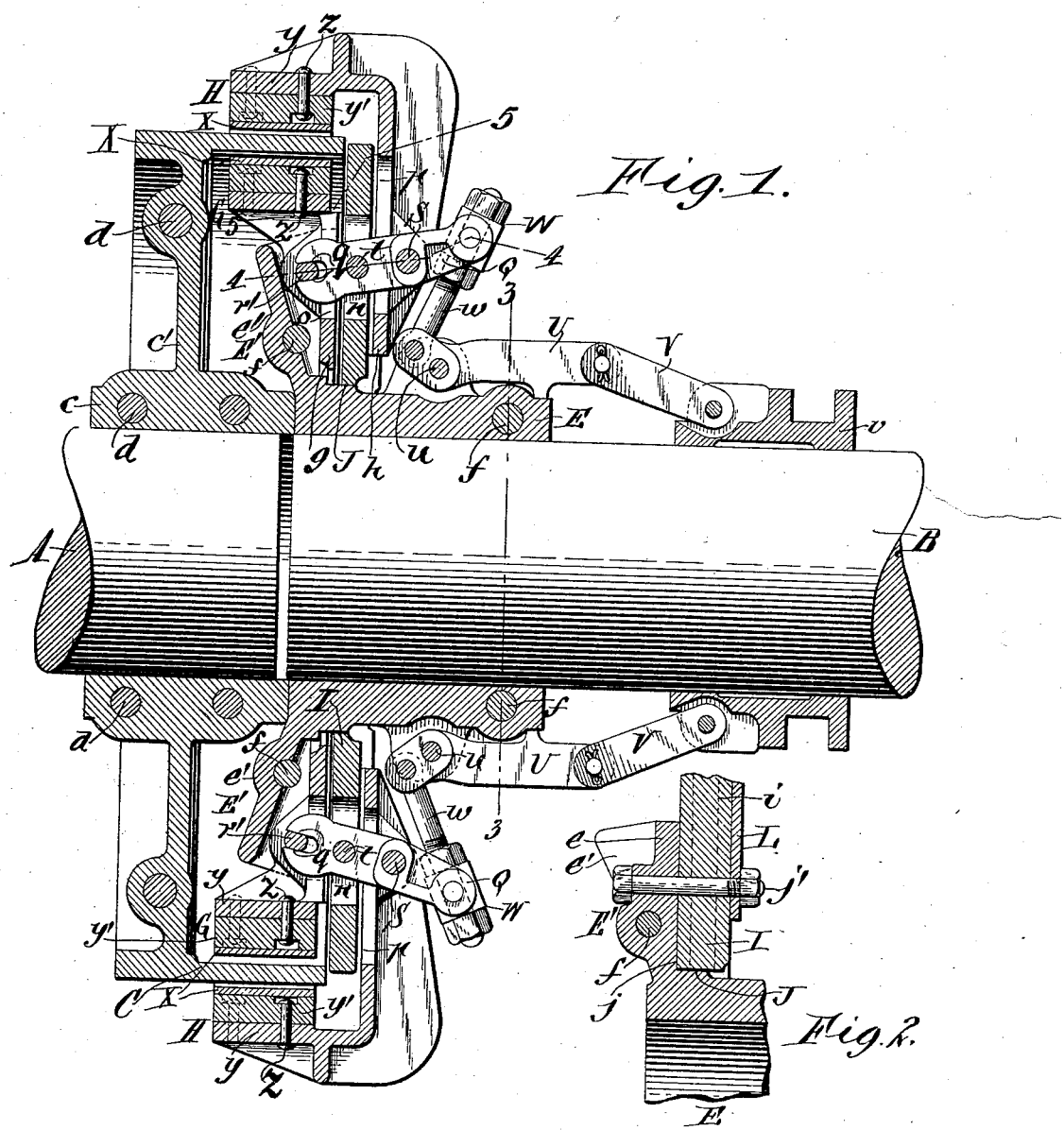
Witnesses:
Richard Sommer.
Alfred Bakenhagen.
Inventor
Harry J. Smith
by Geyer & Paff
Attorneys

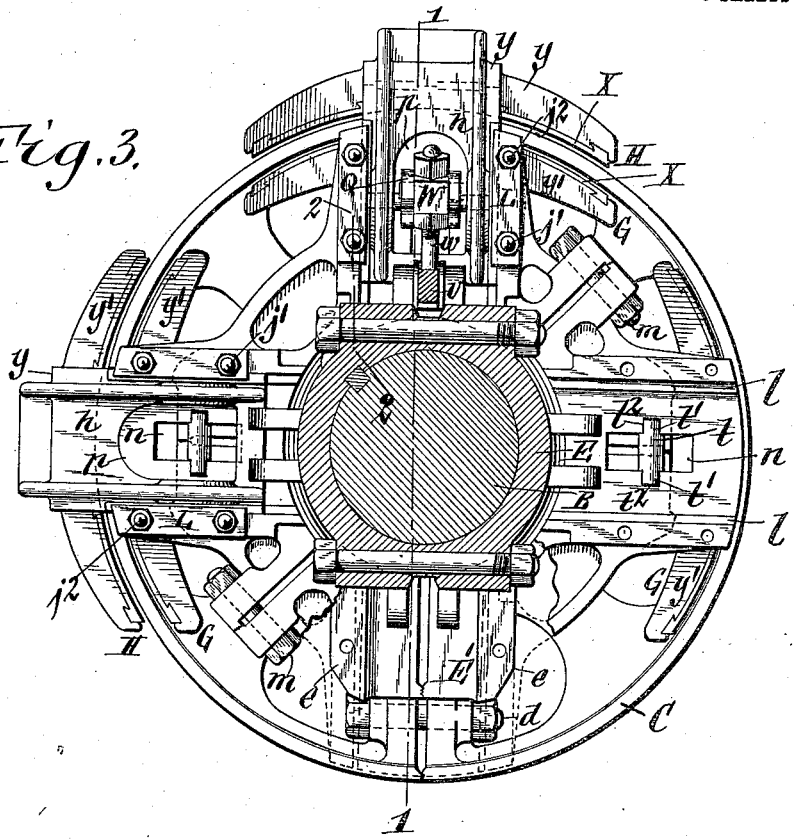

H. J. SMITH.
FRICTION CLUTCH.
APPLICATION FILED MAR. 30, 1910.
1,083,301.
Patented Jan. 6, 1914.
3 SHEETS—SHEET 3.
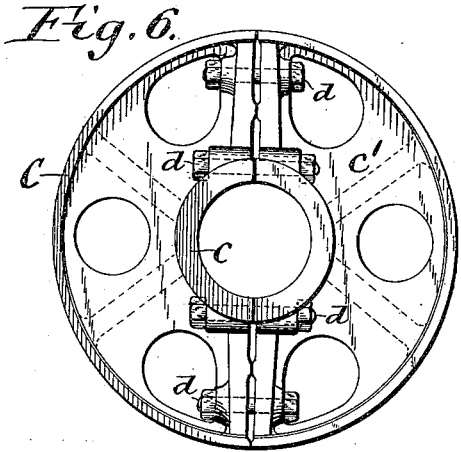
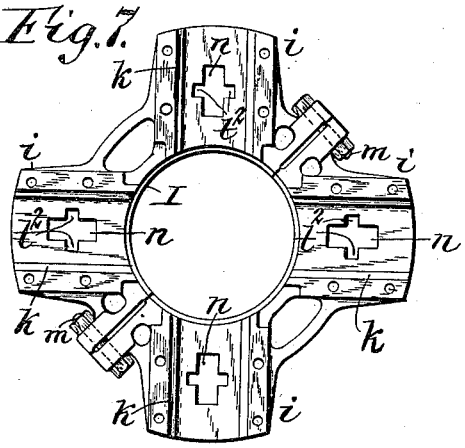
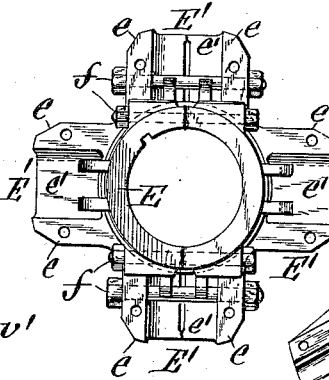
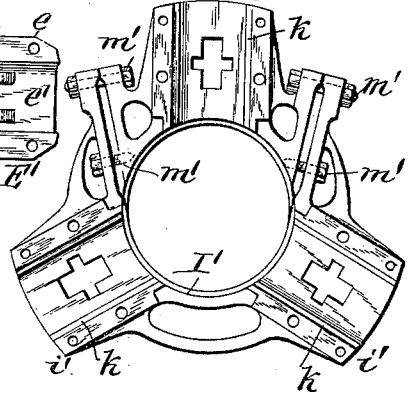
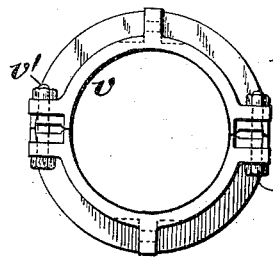
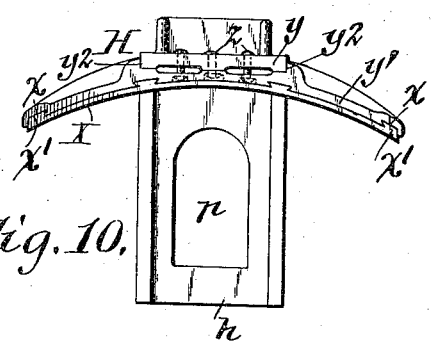
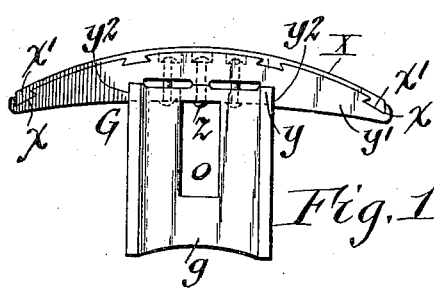
Witnesses:—
Richard Sommer
Alfred Borkenhagen
Inventor
Harry J. Smith
by Geyer & Papst
Attorneys
COLUMBIA PLANOGRAPH CO., WASHINGTON, D. C.

UNITED STATES PATENT OFFICE.

HARRY J. SMITH, OF LAKEWOOD, OHIO, ASSIGNOR TO THE HILL CLUTCH COMPANY, OF CLEVELAND, OHIO, A CORPORATION OF OHIO.

FRICTION-CLUTCH.

1,083,301.  Specification of Letters Patent.  Patented Jan. 6, 1914.

Application filed March 30, 1910. Serial No. 552,387.

*To all whom it may concern:*

Be it known that I, HARRY J. SMITH, a citizen of the United States, residing at Lakewood, in the county of Cuyahoga and State of Ohio, have invented new and useful Improvements in Friction-Clutches, of which the following is a specification.

This invention relates generally to friction clutches and more particularly to friction clutches of the type shown and described in an application for Letters Patent of the United States filed by myself March 11, 1909, and serially numbered 482,648.

One of the objects of this invention is to so construct friction clutches of this type, particularly the larger sizes, that the jaws of the same and the means for guiding the latter are easy of access and can be readily removed for inspection, adjustment and repairs.

My invention has the further object to provide the clutch jaws with a facing of aluminum so as to increase the grip of these jaws and also reduce the cost of maintaining the jaws in serviceable condition.

In the accompanying drawings consisting of 3 sheets: Figure 1 is a vertical longitudinal section, on an enlarged scale, of my improved friction clutch taken in line 1—1, Fig. 3, and showing a clutch having four pairs of jaws and associated parts. Fig. 2 is a fragmentary longitudinal section, on an enlarged scale, in line 2—2, Fig. 3. Fig. 3 is a vertical transverse section in line 3—3, Fig. 1. Figs. 4 and 5 are fragmentary sections in lines 4—4 and 5—5, Fig. 1, respectively. Fig. 6 is a detached face view, on a reduced scale, of the clutch ring. Fig. 7 is a similar view of the fulcrum plate. Fig. 8 is a similar view of the supporting member or spider. Fig. 9 is a similar view of the shifting cone. Figs. 10 and 11 are similar views of the outer and inner jaws, respectively, of the clutch. Fig. 12 is a similar view of a fulcrum plate which is employed when the clutch has three pairs of jaws and associated parts.

Similar letters of reference indicate corresponding parts throughout the several views.

Referring to Figs. 1–11, A, B represent the two shafts which are arranged end to end and which are adapted to be coupled by my improved friction clutch so that motion is transmitted from one of these shafts to the other. On the end of one of these shafts, for example the shaft A, is secured the clutch ring which in the further description of the clutch will be considered as the driven member and which comprises a cylindrical clutch flange C, a hub $c$ secured to the shaft A, and a web or arm $c^1$ connecting the flange and hub. For convenience in applying the clutch ring to its shaft the same is split diametrically and the two sections thus formed are connected by coupling bolts $d$ extending tangentially across the joint between the clutch ring sections, as shown in Fig. 6. On the end of the other shaft B is arranged the spider or main support of the clutch jaws which in the further description of the clutch will be regarded as the driving member and which comprises a cylindrical hub E secured to the shaft B and a plurality of radial arms $E^1$ projecting outwardly from the hub, four of such arms being shown in Figs. 3 and 8. Each of these driving arms comprises two parallel bars $e$ which may be connected along their rear edges by a backwardly curved web $e^1$. This main jaw support, driving member or spider is preferably divided diametrically into two like sections, the line of division extending centrally through the two driving arms on opposite sides of the jaw support, these sections being connected with each other by coupling bolts $f$ extending across the joint between the same, as shown in Figs. 1 and 8.

G, H represent a plurality of pairs of inner and outer clutch jaws which are operatively connected with the spider or driving member, the members of each pair being movable inversely relatively to the flange of the clutch ring for gripping or releasing the same. Each inner jaw is provided with an inwardly extending radial shank $g$ and each outer jaw is provided with an inwardly projecting radial shank $h$ arranged in line with the shank of the companion inner jaw in a direction lengthwise of the clutch.

Between the shanks of the several pairs of clutch jaws is arranged a fulcrum plate which serves as a support for parts of the jaw operating mechanism and also as a means of connecting the sections of the driving member, spider or hub for strengthening and stiffening the latter. This fulcrum plate is provided centrally with a cylindrical collar I and a plurality of arms $i$ projecting radially outward from the collar. The latter is mounted on an annular seat J on the periphery of the driving hub and bears by its rear side against a forwardly facing annular shoulder $j$ arranged on the hub in front of its arms. The fulcrum arms $i$ are secured to the front sides of the driving arms by means of bolts $j^1$ passing through the inner parts of the longitudinal marginal or edge portions of these arms, as shown in Figs. 2 and 4. Between each longitudinal edge of each fulcrum arm and the corresponding longitudinal edge of the companion driving arm a guideway $k$ is provided, the front wall and outer side of this guideway being formed by rabbeting the rear part or side of the respective fulcrum arm while the rear wall of this guide-way is formed by the front side of the adjacent edge of the respective driving arm. The shank of each inner jaw is arranged between the front side of a driving arm and the rear side of a fulcrum arm and each of its longitudinal edges slides radially in one of said guideways $k$.

The shank $h$ of each outer jaw slides at its opposite longitudinal edges in guideways $l$ each of which is formed by rabbeting the outer side of the adjacent part of the respective fulcrum arm and by a gib L secured to the outer side of said fulcrum arm, so that the outer jaw shanks are arranged between the fulcrum arms and the gibs. The gibs are secured to the fulcrum arms and spider arms by the bolts $j^1$, as shown in Figs. 2 and 4, and additionally to the fulcrum arms by stud bolts $j^2$ passing through the outer ends of the gibs and the fulcrum arms, as shown in Fig. 5.

For convenience in applying the fulcrum plate to or removing the same from the driving member or supporting hub the same is divided into sections which are detachably connected and movable laterally relatively to the hub.

In the case of a friction clutch having four pairs of jaws the fulcrum plate has four equidistant arms and in this case the fulcrum plate is preferably divided into two like sections, the line of division being diametrically between adjacent arms $i$ and the two sections being connected by bolts $m$ extending across the joints between the same, as shown in Figs. 3 and 7. The joint between the sections of the fulcrum plate is arranged out of line or at a different angle from the joint between the driving member, spider or hub, so that the solid parts of each of these members extend across the joint of the other member or overlap each other, whereby the sections of each of these members operate as a bridge which connects the sections of the other member, thereby materially strengthening the structure as a whole without making the same unduly heavy to secure this result.

In the case of a friction clutch having three pairs of jaws and a corresponding number of driving arms the collar $I^1$ of the fulcrum plate is provided with three equidistant fulcrum arms $i^1$ and the plate is preferably divided into two sections on tangent lines, one of the sections carrying two fulcrum arms and the other carrying one of such arms, as shown in Fig. 12. These two sections are detachably connected by bolts $m^1$ extending across the joints between the same.

The corresponding fulcrum arms and shanks of the inner and outer jaws are provided respectively with coinciding openings $n$, $o$, $p$ and projecting lengthwise through each set of such openings is a rocker Q. At its rear end the latter is forked and has the opposing sides of its prongs arranged parallel and made flat, as shown at $q$.

In rear of the opening $o$ in the inner jaw shank is arranged transversely a pin the opposite ends $r$ of which are cylindrical and turn in bearings formed on the inner jaw shank on opposite sides of the opening $o$. The central part $r^1$ of the inner jaw pin is reduced and provided on opposite sides with parallel flat sides which are engaged by the flat sides of the fork prongs of the rocker. By this construction a bearing surface of extensive area is provided between the rocker and inner jaw pin which reduces the wear upon these parts and necessitates less frequent renewal of these parts, whereby the life of the clutch is prolonged and the cost of maintaining the same is minimized.

In rear of its front end the rocker is pivotally connected by a cylindrical pivot pin S with the respective outer jaw shank, this pin extending with its central part through an opening in the rocker and seated at its opposite ends in cylindrical seats arranged on the outer jaw shank on opposite sides of the opening $p$ in this shank.

Between the pins S and $r$, $r^1$ the rocker is provided with a cylindrical opening which receives the central part $t$ of the transverse fulcrum pin the opposite ends $t^1$ of which are flattened and engage with correspondingly shaped notches $t^2$ in opposite sides of the opening $n$, thereby connecting the rocker and fulcrum plate but permitting the rocker to move relatively to the fulcrum plate in a direction lengthwise of the axis of the clutch.

Although various means may be employed for operating the rocker for causing the inner and outer jaws to move inversely toward and from the interposed cylindrical clutch flange the means for this purpose shown in the drawings are suitable and comprise an angle lever U pivoted by means of a pin $u$ on the hub or spider, a link V connecting the front arm of this lever with a cone $v$ slidable lengthwise on the shaft B, a block W pivoted on the front end of the rocker, and a link $w$ to the rear arm of the angle lever and adjustably connected with said block. The cone is preferably split diametrically into two sections and its parts are connected on opposite sides of the shaft B by bolts $v^1$, as shown in Fig. 9, or by any other suitable means.

Upon moving the cone rearwardly the several rockers are turned in the direction for causing the inner jaws to grip the inner side of the clutch flange and the outer jaws to grip the outer side of the same, thereby closing the clutch and causing the same to couple the shafts A, B, while upon moving the cone in the opposite direction the rockers are turned in the reverse direction and the inner and outer jaws are disengaged from the clutch flange, thereby releasing or opening the clutch and uncoupling said shafts. To permit of removing the outer jaw the rocker is first removed after driving out the pin connecting the rocker and the outer jaw leaving the latter free to be removed forwardly from the clutch. If it is desired to remove the inner jaws the sections of the fulcrum plate are disconnected from each other and from the spider or driving member after which the inner jaws are free to be removed forwardly from the spider. By disconnecting the sections of the spider, cone and clutch ring these parts may also be removed laterally from the shafts A, B without disturbing the relation of the same.

It will thus be noted that in this construction of friction clutch the several parts of the same are all easily accessible and removable for inspection, adjustment or repairing and that dismembering and assembling of the several parts can be effected conveniently and quickly, so that no prolonged interruption in the use of the shafts need occur at any time.

By constructing friction clutches in the manner described, it is possible to use all of the parts of the clutch excepting the spiders or driving hubs, cones, and the clutch rings for shafts of different diameters, thereby reducing the number of parts which a dealer is required to keep in stock in order to supply clutches of a certain size but of different sizes of hub bores to suit shafts of various diameters.

Heretofore, the jaws of friction clutches have usually been provided with gripping faces or shoes of wood. These are objectionable because they not only wear very rapidly owing to the softness of wood and involve considerable expense to keep the clutch in proper condition, but they are also deficient in gripping power particularly in the case of very large clutches or ones subjected to very heavy duty.

With a view of increasing the grip of the jaws on the clutch flange and reducing the wear on the same without materially increasing the cost of maintenance, the jaws are provided with shoes or facings X of aluminum. The initial cost of shoes of this material is not much more than a good quality of wood suitable for clutch shoes, its gripping effect is much greater than wood and its wearing qualities are also superior to wood. In using shoes of this material the same may be secured to the jaws in any suitable manner but preferably by constructing each jaw in two sections, a relatively fixed section $y$ which is formed integrally with the shank of the jaw and a removable section $y^1$ which is connected by rivets $z$ or otherwise with the fixed jaw section and which carries the aluminum shoe. The latter is preferably secured to the removable jaw section by casting the same on this jaw section and providing the latter on its face with a plurality of undercut or dovetail grooves or recesses $x$ which receive correspondingly shaped projections or ribs $x^1$ on the back of the shoe, as shown in Figs. 10 and 11. By this means the shoes are secured, anchored or attached to the removable jaw sections and prevented from becoming loose while in use. The rivets which connect the fixed and movable sections of each jaw are relieved from circumferential shearing strains by means of lugs or shoulders $y^2$ formed on the back of the removable jaw section and engaging circumferentially opposite sides of the fixed jaw section, as shown in Figs. 10 and 11.

Whenever the shoes become worn the rivets $z$ are cut off to permit of separating the removable jaw section from the fixed jaw section and replacing the same by a removable jaw section having a new shoe. By thus mounting the shoe on a removable section of the jaw it is possible to send the removable jaw section to the factory for applying a new shoe thereto and returning the same which can be done at less cost than would be incurred if the entire jaw and shank were shipped back and forth for this purpose, thereby bringing this invention within commercial requirements.

I claim as my invention:

1. A friction clutch comprising a clutch flange, a spider which is divided into sections, an annular fulcrum plate divided into sections and mounted on said spider, jaws adapted to engage said flange and arranged on opposite sides of said fulcrum plate, the joint between the sections of said spider and said fulcrum plate being out of line with each other.

2. A friction clutch comprising a clutch flange, a spider which is divided into sections, an annular fulcrum plate divided into sections and mounted on said spider, jaws adapted to engage said flange and arranged on opposite sides of said fulcrum plate, the joint between the sections of said spider and said fulcrum plate being out of line with each other, so that the sections of each of said divided members extend across the joint between the sections of the other divided member, and bolts connecting each section of one of the divided members with two sections of the other divided member on opposite sides of the joint between the last mentioned sections.

3. A friction clutch comprising a clutch flange, a spider having a circular seat on the periphery of its hub, an annular fulcrum plate engaging its bore with the seat of the spider, and jaws guided on opposite sides of said fulcrum plate and adapted to engage said flange.

4. A friction clutch comprising a clutch flange, a spider, a fulcrum plate, inner jaws adapted to engage with the inner side of said flange and having a shank, outer jaws adapted to engage with the outer side of said flange and having a shank, a rocker pivoted centrally on the fulcrum plate and pivotally connected at one end with the shank of the outer jaw and provided at its opposite end with a fork having parallel sided prongs, and a pivot pin having a flat sided central part which engages between the prongs of said fork, and cylindrical ends which turn in bearings on the shank of the inner jaw.

Witness my hand this 28th day of March, 1910.

HARRY J. SMITH.

Witnesses:
H. D. CAMPBELL,
GEO. D. COWLEY.

---

Copies of this patent may be obtained for five cents each, by addressing the "Commissioner of Patents, Washington, D. C."